(12) United States Patent
Paros et al.

(10) Patent No.: US 8,616,054 B2
(45) Date of Patent: Dec. 31, 2013

(54) HIGH-RESOLUTION DIGITAL SEISMIC AND GRAVITY SENSOR AND METHOD

(75) Inventors: Jerome M. Paros, Kirkland, WA (US); Theo P. Schaad, Seattle, WA (US)

(73) Assignee: Quartz Seismic Sensors, Inc., Redmond, WA (US)

(*) Notice: Subject to any disclaimer, the term of this patent is extended or adjusted under 35 U.S.C. 154(b) by 649 days.

(21) Appl. No.: 12/187,229

(22) Filed: Aug. 6, 2008

(65) Prior Publication Data

US 2010/0031746 A1     Feb. 11, 2010

(51) Int. Cl.
*G01V 7/02*     (2006.01)

(52) U.S. Cl.
USPC ........................................ 73/382 G

(58) Field of Classification Search
USPC ........................................ 73/382 G
See application file for complete search history.

(56) References Cited

U.S. PATENT DOCUMENTS

| | | | | |
|---|---|---|---|---|
| 4,406,966 A | * | 9/1983 | Paros | 310/321 |
| 4,517,841 A | * | 5/1985 | Peters et al. | 73/514.13 |
| 4,897,541 A | | 1/1990 | Phillips | 250/227 |
| 6,570,514 B1 | | 5/2003 | Velazquez | 341/118 |
| 6,595,054 B2 | | 7/2003 | Paros et al. | 73/504.04 |
| 6,826,960 B2 | * | 12/2004 | Schaad et al. | 73/514.29 |
| 2006/0230829 A1 | * | 10/2006 | Byrd | 73/510 |

FOREIGN PATENT DOCUMENTS

| | | |
|---|---|---|
| JP | 54-20780 A | 2/1979 |
| JP | 56-119519 A | 9/1981 |
| JP | 60-033056 A | 2/1985 |
| JP | 05-093681 A | 4/1993 |
| JP | 08-240476 A | 9/1996 |
| JP | 10-038673 A | 2/1998 |
| JP | 2003-042833 A | 2/2003 |

OTHER PUBLICATIONS

International Search Report and Written Opinion dated Feb. 8, 2010 for International Application No. PCT/US2009/050408.
Notice of Rejection for JP Application No. 2011-522090 mailed on Jul. 9, 2013.

* cited by examiner

*Primary Examiner* — Hezron E Williams
*Assistant Examiner* — Mark A Shabman
(74) *Attorney, Agent, or Firm* — Dorsey & Whitney LLP

(57) ABSTRACT

A high-resolution digital seismic and gravity sensor includes an inertial mass connected to one or more force-sensitive resonators. The weight of the inertial mass is substantially unloaded with a spring arrangement when exposed to the force of the static gravity field. Seismic accelerations applied to the base of the seismic and gravity sensor, or changes in the gravitational field, generate loads that are transmitted to force-sensitive resonators so that changes in resonant frequency are related to the applied load. The changes in resonant frequency are thus a measure of the seismic accelerations and gravitational field variations.

50 Claims, 10 Drawing Sheets

HIGH-RESOLUTION DIGITAL SEISMIC AND GRAVITY SENSOR AND METHOD

TECHNICAL FIELD

This invention relates to new and improved high-resolution seismometers and gravimeters that employ resonant transducers as sensing elements.

BACKGROUND OF THE INVENTION

Progress in the science of measuring ground motion from distant earthquakes dates primarily to the last one hundred years. Key developments were the invention by La Coste and Romberg of a long-period vertical seismograph in 1934, and the introduction of active electronic sensing and feedback pioneered by Block and Moore in the 1960's, culminating in what is still the state-of-the-art long-period leaf-spring seismometer of Wielandt and Streckeisen in 1982. These seismometers are constructed with large inertial masses supported by soft helical springs or curved leaf-springs and force-balance feedback systems. Improvements include using springs of constant modulus materials, advanced analog-to-digital converters, and digital filters. The primary output is an analog signal that is related to ground velocity, which can be converted to ground acceleration by differentiation. Typical sensitivities to slow ground acceleration are measured in nano-g's or better. To achieve the high sensitivity, the applied acceleration is usually limited to only about 1% of the earth's gravity. Thus the full scale range is limited and the output is clipped if the earthquake is strong.

On the other hand, the science of measuring ground acceleration directly, for instance with force-balance accelerometers, has resulted in devices that have a much larger acceleration full scale and are particularly sensitive at short time intervals. These devices are commonly called strong-motion sensors. Their shortcoming is that they are not very sensitive to weak long-period vertical ground acceleration.

Another disadvantage of conventional long-period and strong-motion seismometers is the analog output of the sensor that is converted into a digital signal by an analog-to-digital converter with limited numeric dynamic range and poor long-term stability. An intrinsically digital seismic and gravity sensor with frequency output that can be measured in the time domain in relation to a very precise clock standard provides very high short-term resolution and the highest long-term stability.

Therefore, a need exists for high-resolution, inherently digital seismic and gravity sensors that measure accelerations directly, particularly sensors that are compact in size, use low power, have low temperature sensitivities, and use non-magnetic materials.

A number of force-sensitive resonators are described in the prior art. Single vibrating beam force sensors are described in U.S. Pat. Nos. 3,470,400, 3,479,536, 4,445,065, 4,656,383, 4,658,174, 4,658,175, 4,743,790, 4,980,598, 5,109,175, and 5,596,145. Double vibrating beam force sensors referred to as Double-Ended Tuning Forks ("DETF") are described in U.S. Pat. Nos. 2,854,581, 3,148,289, 3,238,789, 4,215,570, 4,372,173, 4,415,827, 4,469,979, 4,531,073, 4,757,228, and 4,912,990. In these devices, the change in frequency of oscillation of the resonant force sensors is a measure of changes in the applied force.

Single-axis accelerometers employing resonator beams are disclosed in U.S. Pat. Nos. 2,984,111, 3,190,129, 3,238,789, 3,440,888, 3,465,597, 4,091,679, 4,479,385, 4,980,598, 5,109,175, 5,170,665, 5,334,901, and 5,596,145. In general, the devices disclosed in these patents are open-loop sensors without servo feedback, consisting of an inertial mass that exerts a force on the resonator under acceleration along the sensitive axis. The inertial mass is usually guided by a suspension system or flexures. None of these devices reaches the sensitivity of state-of-the-art long-period seismometers, as the full scale is always in excess of the earth's gravitational acceleration and the dynamic range is not high enough to reach a sensitivity of nano-g's or better. Triaxial accelerometers employing force-sensitive resonators are disclosed in U.S. Pat. No. 6,826,960 and in U.S. Pat. No. 7,178,401.

SUMMARY OF THE INVENTION

A sensor is disclosed for providing high-resolution, inherently digital measurements of seismic accelerations and variations in the gravitational field. The sensor includes an inertial mass connected to one or more force-sensitive resonators. The weight of the inertial mass is substantially unloaded with a spring arrangement when exposed to the force of the static gravity field. Forces generated by ground acceleration or changes in the gravitational field are coupled to a load-sensitive resonator either directly or via a force or torque transmitting arrangement. Mechanical overload stops may be placed to limit the small motion of the inertial mass such that the loads stay within the acceptable range of the force-sensitive resonators. The material of the springs and the mechanical elements consisting of base frame, suspension elements, interconnections, and resonators may be chosen to minimize the temperature sensitivity of the sensor. The force-sensitive resonators are set into their natural resonant frequencies by electronic means, and the resultant frequency output signal is measured with high-resolution frequency counters. The acceleration-induced changes in resonant frequency are thus high-resolution, inherently digital measurements of seismic inputs or changes in gravitational fields.

DETAILED DESCRIPTION OF THE INVENTION

Figure 1A:
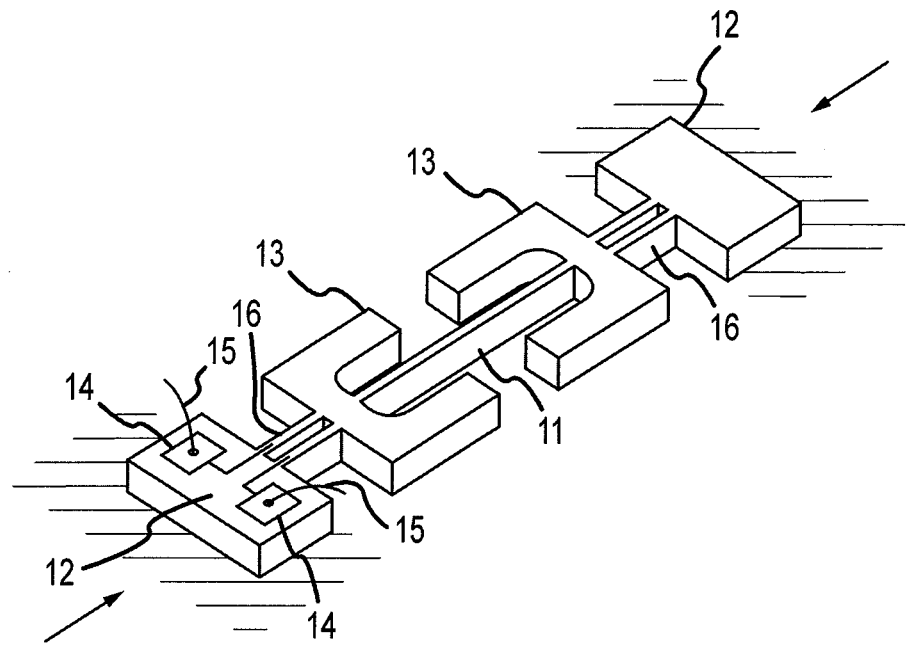
FIG. 1A is an isometric view of a conventional single-beam resonant transducer.

A seismometer is an instrument that measures ground motion, velocity, or acceleration. The three quantities are interrelated by Newtonian physics. A time-series measurement of one of them can be used to find the other two, either by integration or by differentiation. In theory, it would not initially matter which quantity is measured, but, until now, practical considerations have favored velocity-based seismometers. The main reasons for this preference are sensitivity and bandwidth. The bandwidth of greatest interest in the detection of earthquakes is in the period range from about 1 to 100 seconds, usually referred to as the long-period domain. Conventional seismometers have large inertial masses supported by weak springs with a damped natural oscillation in the long-period range. As such, they are optimized for long-period velocity measurements. The sensitivity trails off for fast ground motion and very slow changes of acceleration or gravity.

The seismic and gravity sensor according to various embodiments of this invention measures acceleration directly. Mechanically, the response is flat for a much larger bandwidth, specifically, between the resonant pole of the device, which can be higher than 100 Hz, and the static domain of infinite periods. As such, it is not only sensitive to seismic motion, but can also measure changes in the gravitational field over very long periods, for instance those generated by the passing moon.

Until now, analog seismometers based on the measurement of acceleration have not been as sensitive as conventional velocity-based seismometers, which are also analog. It is therefore important to understand the advantages of making an inherently digital seismic and gravity sensor with greater sensitivity and resolution. The dynamic range is defined as the region between sensor resolution and full scale output. The dynamic range is usually expressed in decibels, dB, defined as the base-10 logarithm of the ratio between full scale and resolution, multiplied by 20. For instance, a sensor that provides output with a sensitivity of one part per million of full scale range has a dynamic range of 120 dB. Conventional state-of-the-art seismometers produce an analog voltage output that is converted into digital form with an analog-to-digital converter. This conversion is currently done with 24 binary bits (144 dB) including some margin of over-ranging. In order to achieve sensitivities in the acceleration range of 0.1 nano-g, the full scale cannot be greater than a few milli-g, limiting the measurement of large seismic motion.

The high-resolution, high-dynamic range seismic and gravity sensor described herein is based on the principle of measuring the seismic inputs with an inherently digital force-sensitive resonator. The output of the force-sensitive resonator is the amplified waveform of its natural resonant frequency that changes with acceleration input. Thus, the change in resonant frequency is a measure of ground acceleration. The frequency output is measured with high-speed clocks in the time-domain, which is inherently much more precise than the conversion of an analog signal to a digital one. Conventional commercial frequency counters with 200 to 300 MHz counting clocks can measure frequencies over a dynamic range of 200 dB at 1 Hz sampling. The period change of the force-sensitive resonator is typically 10% of frequency, such that 180 dB of dynamic range of acceleration is possible. New counting algorithms based on over-sampling, in conjunction with FIR or IIR filters and high-speed clocks and processors, can also be used. High-resolution seismic and gravity measurements are possible because the various embodiments of the invention use one or more springs to unload most, if not all, of the weight of an inertial mass to which one or more digital force-sensitive resonators are connected. These springs act along the axis of the gravitational field, and, by unloading most of the weight of the inertial mass, they allow measurements of the force applied to the resonators when seismic accelerations and gravity variations are very small.

The large dynamic range of the measurements, coupled with the design and method of offsetting the gravitational load of the inertial mass with the springs, results in the seismic and gravity sensor having a very high resolution. In fact, sensitivities as low as 0.1 nano-g are feasible if the full scale range is as high as 0.1 g, resulting in acceleration dynamic ranges to 180 dB or greater. Thus, high-resolution measurements of strong earthquakes are now possible. A seismic and gravity sensor based on force-sensitive resonators can be hundreds of times more sensitive than an analog long-period seismic instrument with the same full scale.

Another advantage of clock-based digital measurements is the long-term stability of the resonator sensor and the reference clock in the counting system. Slow changes of the gravitational field can be detected. Such instruments are called gravimeters, and they can serve the dual purpose of seismometer and gravimeter.

Figure 1B:
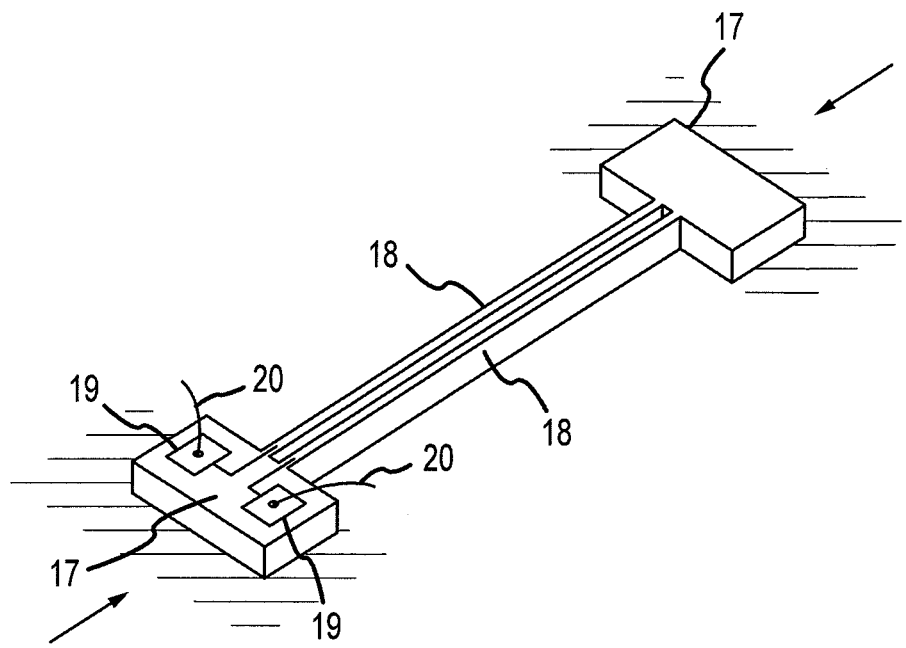
FIG. 1B is an isometric view of a conventional dual-beam resonant transducer.

FIGS. 1A and 1B depict prior art high-precision resonant sensing elements that are loaded between mounting pads 12 and 17, respectively. As shown in FIG. 1A, the resonator is a center span vibrating beam 11 isolated by a low-frequency mechanical filter consisting of isolating masses 13 and isolating springs 16 between the mounting pads 12 and the masses 13. Resonant transducers can be made with double-ended tuning forks as shown in FIG. 1B. The tuning fork includes tines 18 in the form of elongated beams with dimensions chosen to make the resonant frequency of the transducer a strong function of applied tension or compression. These high-precision resonant transducers are designed and constructed such that there is a high sensitivity to the applied load, and the tight constraints result in small displacements along the force axis. If the resonators are fabricated from piezo-electric quartz, they can be excited into their natural resonant frequency by electrical traces 14 and 19, respectively, connected to an oscillator circuit by conductive leads 15 and 20, respectively. Measurement of the frequency output of the oscillator is thus a measure of the forces applied to the resonators.

Figure 2A:
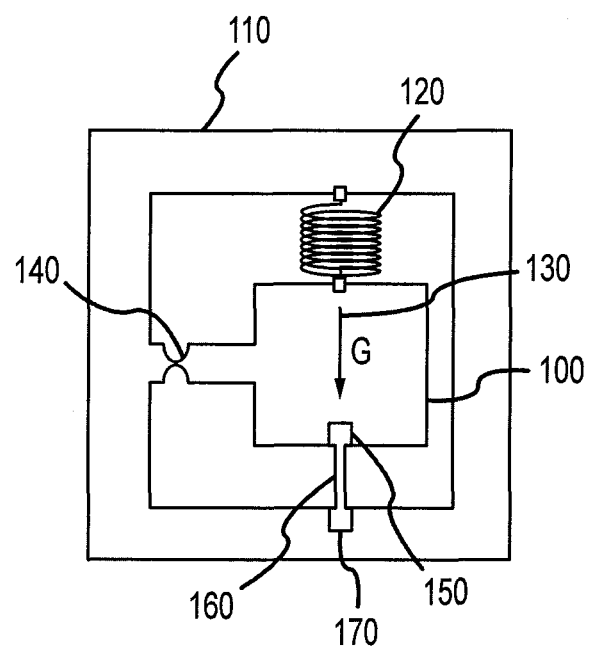
FIG. 2A is a planar view of the basic elements of a digital high-resolution seismic and gravity sensor: inertial mass, gravity compensating spring, and force-sensitive resonator.

FIG. 2A shows an illustrative example of a seismic and gravity sensor according to one embodiment of the invention. Pendulous inertial mass 100 is suspended from base frame 110 by soft helical spring 120. Spring 120 counterbalances the force on mass 100 due to the static gravitational field vector, G, 130 to maintain mass 100 in a counterbalanced, neutral position about flexure hinge pivot 140. First end 150 of force-sensitive resonator 160 is connected to mass 100 and second end 170 of force-sensitive resonator 160 is connected to base frame 110 when the mass 100 is suspended in gravity field 130 by spring 120 in a substantially counterbalanced, neutral position. The equivalent spring rate of the force-sensitive resonator 160 is substantially higher than that of support spring 120. Variations in gravity field 130 or additional acceleration inputs, such as those due to seismic activity, produce changes in load to force-sensitive resonator 160. The changes in frequency of force-sensitive resonator 160 are thus measures of acceleration inputs and variations in gravity field 130.

Figure 2B:
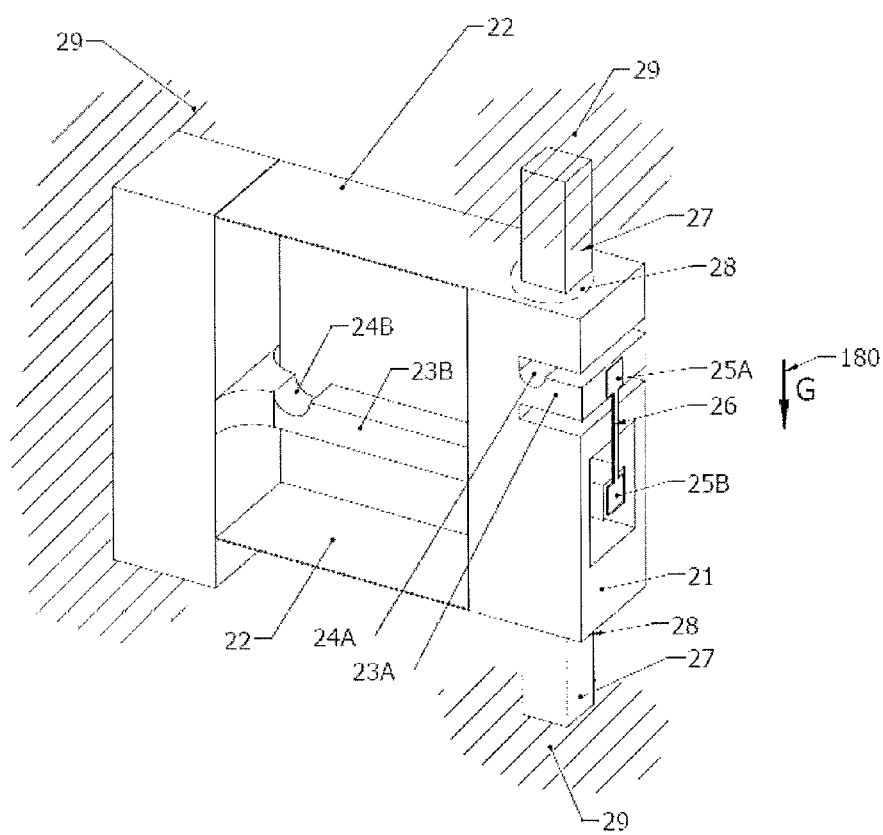
FIG. 2B is an isometric view of a digital high-resolution seismic and gravity sensor with an inertial mass, gravity compensation, transmitting means applying loads to a force-sensitive digital resonator, and overload mechanical stops.

FIG. 2B shows an illustrative example of a seismic and gravity sensor according to another embodiment of the invention. An inertial mass 21 is suspended by a double-cantilever leaf-spring 22 from a sensor frame 29. A force-sensitive resonator 26 is attached in series by mounting pads 25A from support member load-carrying beam 23A to the inertial mass 21 and in series by mounting pad 25B to a support member load-carrying beam 23B. The beam 23B is attached to the frame 29 and extends through an aperture in the mass 21. Variations in gravity field 180 or additional acceleration inputs, such as those due to seismic activity, produce changes in load to mass 21 that are applied through support member load-carrying beam 23A to force-sensitive resonator 26. Support member load-carrying beam 23B and notch 24B are in series with the resonator 26 via mounting pad attachment 25B as acceleration-induced forces are transmitted between mass 21 and frame 29. The changes in frequency of force-sensitive resonator 26 are thus measures of acceleration inputs and variations in gravity field 180. In one embodiment, the compliances of support member load-carrying beams 23A and 23B and notches 24A and 24B are adjusted to allow increased displacement of mass 21 when subjected to acceleration-induced loads.

Increased movement of the mass 21 facilitates the placement of mechanical overload stops 27 at locations that can precisely limit the maximum force applied to the resonator 26. Under normal displacement motion of the inertial mass 21, the stops 27 are separated by a gap 28, and the inertial mass is free to move within the stop limits. The entire sensor may be installed in a sealed, gas-filled housing whereby the gap 28 can provide squeeze-film damping of the mass/spring arrangement.

According to one embodiment of the invention, the leaf-spring 22 offsets most of the weight of the mass 21 so that the resonator 26 is substantially unloaded when exposed only to the acceleration of gravity G 180. This can be accomplished by attaching the resonator 26 to the mass 21 and the beam 23 while the resonator 26 is unstressed in the presence of acceleration due only to gravity G 180.

Another consideration in the design of the seismic and gravity sensor of FIG. 2B is the frequency of the resonant pole of the device, which is the natural frequency of the inertial mass suspended by the stiffness of the force-sensitive resonator. It is desirable to place the resonant pole well above the frequency range associated with excitations of seismic cultural (man-made) noise. Typical practical resonators 26 are much stiffer than the support springs 22, and the natural frequency of the mass/spring arrangement, hence the frequency of the resonant pole, is high enough to avoid seismic cultural noise.

Figure 3:
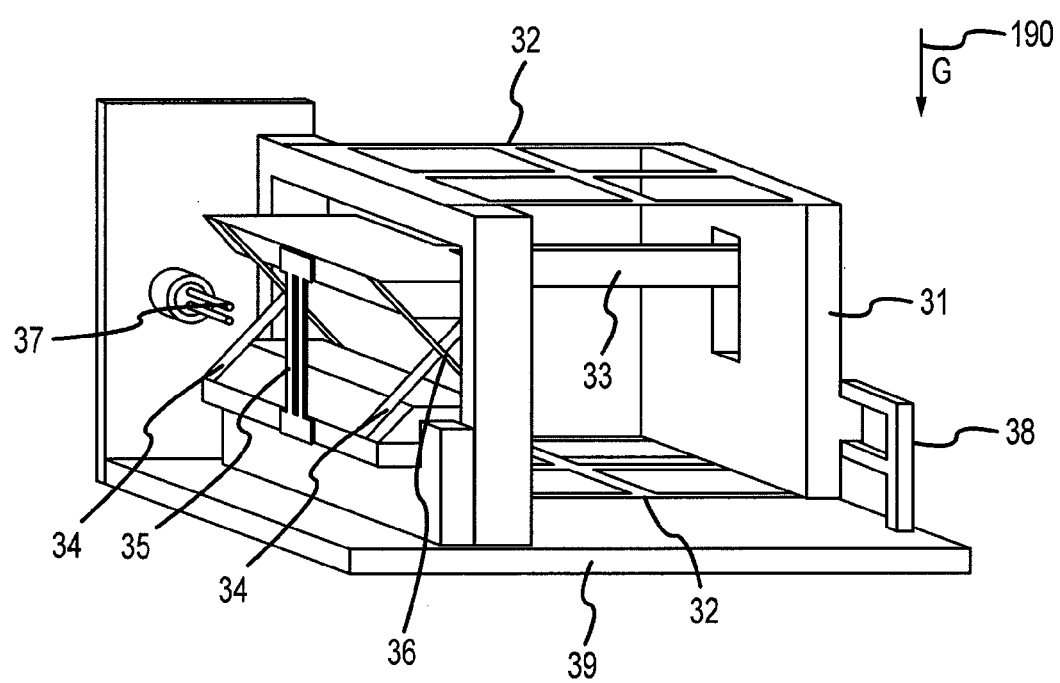
FIG. 3 is an isometric view of a digital high-resolution seismic and gravity sensor with a double-cantilevered spring as gravity compensation, supporting an inertial mass with a load transmission balance arm over a crossed hinge flexure, coupled to a force-sensitive resonator.

FIG. 3 is an isometric drawing of an embodiment of the invention based on the same principle as the foregoing example but with additional features. In this example, a mass 31 is suspended by a double-cantilever spring 32, preferably made from crystalline quartz. Crystalline quartz springs have thermal advantages over other spring materials. Most springs used in conventional seismometers are made from constant modulus metals that have a low thermoelastic coefficient (small change in Young's elastic modulus under temperature). These constant modulus alloys result from a careful combination of precise chemical composition, work-hardening, heat treatments, and exposure to magnetic fields. Crystalline quartz can be cut in preferred directions to make its elastic vibrations essentially insensitive to temperature, a very useful feature in the design of quartz clocks. The inclusion of crystalline quartz springs thus minimizes temperature effects. Quartz crystal cuts with low temperature coefficients are discussed in a treatise by R. Heising, W. P. Mason, and R. A. Sykes. Precise mathematical calculations of the thermal properties have been developed involving the I.R.E. angles of the crystal direction. A further advantage of using crystalline quartz is that the thermal properties are intrinsically stable and not dependent on the heat treatment history and precise chemical composition of alloys.

With further reference to FIG. 3, seismic accelerations and changes in the gravitational field generate loads between base 39 and mass 31 that are transmitted to a force-sensitive resonator 35. Acceleration-induced forces are imparted to the resonator 35 through a load-transmission beam 33 and a flexure mounted on the base 39 that consists of crossed hinges 34, again, preferably, made of crystalline quartz. The use of a load-transmitting beam 33 pivoting about the center 36 of the crossed hinges 34 allows greater displacement of the internal mass 31 without overloading the resonator 35, thus facilitating the placement of mechanical overload stops 38. Additionally, the use of a load-transmitting beam 33 allows the force applied to the resonator 35 to be scalable with the lever arm ratio of the balance arm.

An advantageous property of the seismic and gravitational sensor embodiment of FIG. 3 is that the use of quartz for the double-cantilever spring 32 and the hinges 34 can balance the thermal expansion coefficient of the quartz resonator 35. Another quartz strap (not shown) connects the load-transmission beam 33 and the inertial mass 31 to completely balance the thermal expansions within the flexure arrangement. The entire apparatus can be sealed, evacuated, and, optionally, filled with an inert gas. The overload stops 38 are held at a stopping distance such that the inert gas dampens the motion of the inertial mass 31. A hermetic feed-thru 37 connects electrical leads of the resonator with an external oscillator circuit.

As with the sensor of FIG. 2B, the sensor of FIG. 3 preferably uses the double-cantilever spring 32 to substantially counterbalance and unload the mass 31 when exposed only to the acceleration of the static gravity field G 190.

Figure 4:
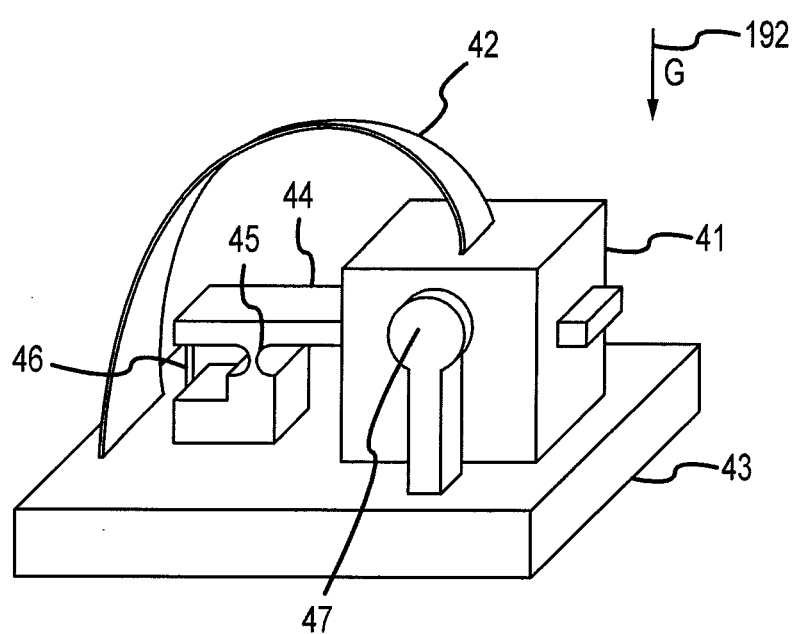
FIG. 4 is an isometric view of a digital high-resolution seismic and gravity sensor with a curved leaf-spring supporting the inertial mass, coupled to a force-sensitive resonator with a flexure suspension.

FIG. 4 is an isometric drawing of an embodiment of the high-resolution seismic and gravity sensor with an inertial mass 41 suspended by a curvilinear leaf-spring 42. To minimize the temperature sensitivity of the spring 42, materials of the spring are preferred that have a low thermoelastic coefficient. Seismic accelerations and gravity variations produce loads that are transmitted from the mass 41 to a force-sensitive resonator 46 via an arm 44 and a flexure pivot 45. As with the other embodiments, the spring 42 may unload the resonator 46 in the static gravity field G 192 to allow a high resolution. The seismic and gravity sensor shown in FIG. 4 includes one or more optional permanent magnets or magnetic coils 47 that are positioned a short distance from the surface of the inertial mass 41. The magnetic field induces electric currents that are dissipated in the internal mass 41, thereby dampening the motion of the inertial mass 41.

Figure 5:
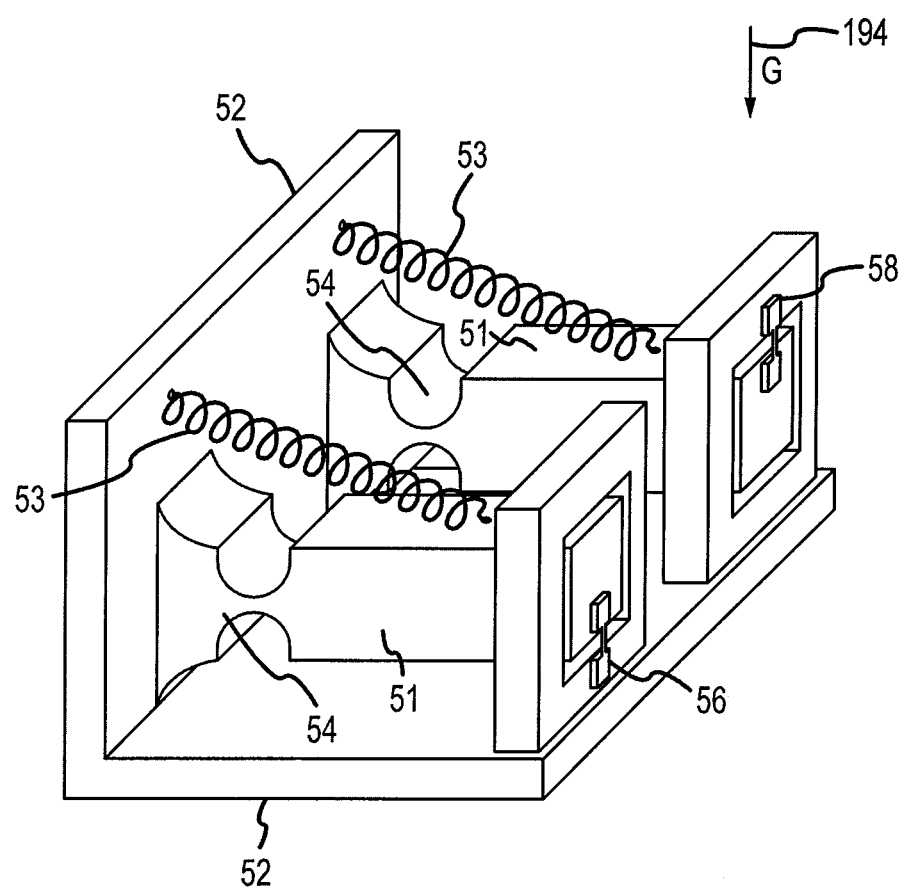
FIG. 5 is an isometric view of a digital high-resolution seismic and gravity sensor with two inertial masses suspended by low-spring-rate helical springs, coupled to force-sensitive resonators. For acceleration applied to the inertial masses, one resonator senses compressive stresses, while the other senses tensile stresses.

FIG. 5 is an isometric drawing of an embodiment of a digital high-resolution seismic and gravity sensor with dual inertial masses 51 suspended by respective helical springs 53 to substantially compensate for the static gravity field G 194. Acceleration applied to the base frame 52 generate loads on masses 51 that are coupled through flexure pivots 54 to force-sensitive resonators 56 and 58. The arrangements of each of the mass 51 and spring 53 pairs are nearly identical except that the force resonators 56, 58 are attached differently. The load on the force resonator 56 is compressive under downward load of the mass 51, whereas the load on the force resonator 58 is tensile under the same load. The outputs of the two resonators 56 and 58 are identical except that the force to frequency sensitivity is opposite in polarity. This difference can be used to further improve the performance of the seismic and gravity sensors in a measurement system. The natural resonant frequency of the resonators may be non-linear with the applied force. In a linear system, higher-frequency vibrations along the sensitive axis would average out to zero, but in a non-linear system, the averaged measurement may shift slightly from a neutral value. This phenomenon is called vibration rectification. Its magnitude is independent of sensor orientation. In the example shown in FIG. 5, the two resonators 56 and 58 produce opposite frequency changes to the seismic inputs. The difference of the outputs therefore distinguishes between common mode errors like vibration rectification and those from real seismic inputs. Other common mode errors such as those due to temperature are reduced by this push-pull tension-compensation design.

Figure 6:
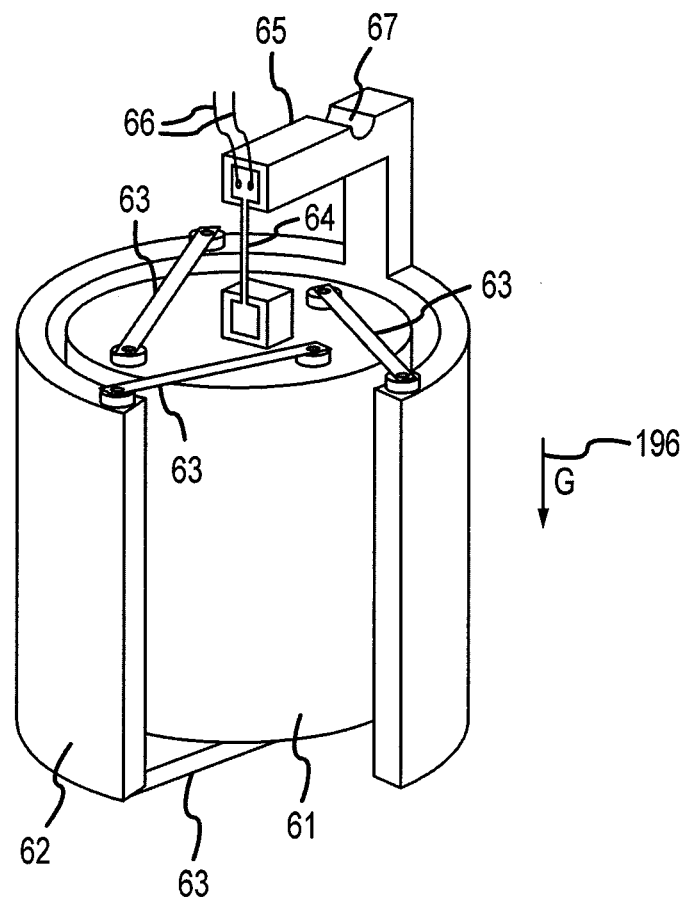
FIG. 6 is an isometric view of a compact cylindrical digital high-resolution seismic and gravity sensor with an inertial mass supported by cantilevered springs coupled to a digital force-sensitive resonator.

FIG. 6 is an embodiment of the digital high-resolution seismic and gravity sensor in a compact cylindrical form. An inertial mass 61 is suspended by three cantilevered springs 63 from the upper end of a cylindrical frame 62, with three similar springs 63 at the bottom of the frame 62 to guide the inertial mass 61 along the cylindrical axis of the device. Seismic accelerations and changes in the static gravitational field G 196 generate loads in a force-sensitive resonator 64 that are coupled to the resonator 64 through connections 65 and 67. As with the other embodiments, the springs 63 may substantially unload the force-sensitive resonator 64 in the static gravity field G 196. Electrical wires 66 lead to an oscillator circuit (not shown). Also, the compliance of the beam 65 and notch 67 may be adjusted to enhance the displacement of the mass 61 relative to the frame 62 and provide the advantages explained above with reference to FIG. 2B.

Figure 7:
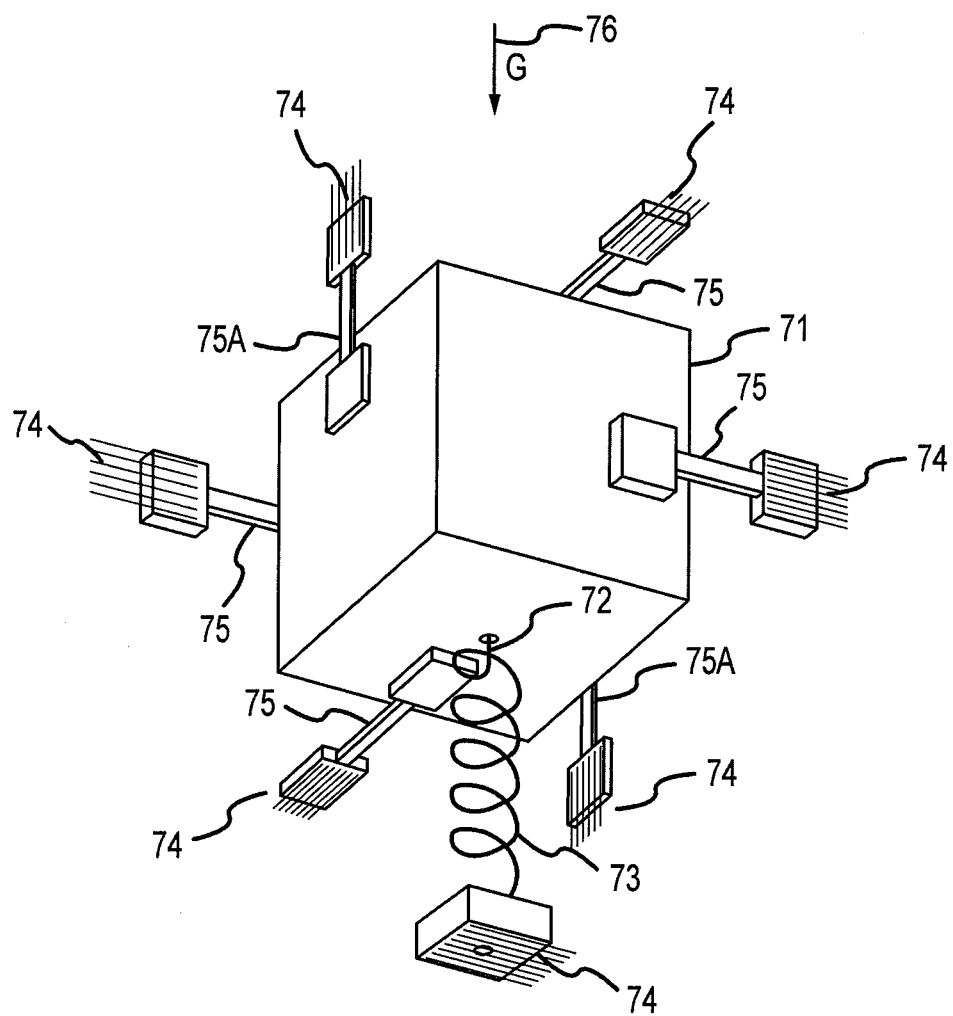
FIG. 7 is an isometric view of a triaxial digital high-resolution seismic and gravity sensor with an inertial mass held by six force-sensitive resonators and a gravity compensating helical spring.

FIG. 7 is an isometric drawing of a high-resolution triaxial seismic and gravity sensor according to another embodiment of the invention. An inertial mass 71 is supported from base 74 by at least one spring 73 and three pairs of support members 75 attached to the inertial mass 71. Each pair of the support members 75 extend from the inertial mass 71 in substantially parallel directions with respective axes that are mutually orthogonal to each other. The support members 75 in each pair are spaced apart from each other to suspend the inertial mass 71 in three substantially orthogonal directions. Acceleration-induced loads of the inertial mass 71 are transmitted to the support members 75. The support members 75 are force-sensitive resonators or comprise stress sensors that measure the forces applied to the support members. A helical spring 73 acts on the center 72 of the inertial mass 71, substantially counterbalancing the vertical gravitational field G 76 to allow the sensor to have a very high resolution. Since the spring 73 can unload the vertical resonators 75A, the size of the mass 71 can be very large to increase the sensitivity of the sensor without overstressing the resonators 75A. The material of the spring 73 is preferentially made of a material with a low thermoelastic coefficient. Alternatively, it can be made of a material with a matched expansion coefficient, such that the forces due to the expansion of the spring 73 under increasing temperature cancel the weakening of the spring. Unlike some of the previously described sensors, which can only measure acceleration along one axis, the sensor shown in FIG. 7 can measure acceleration in any direction.

Figure 8:
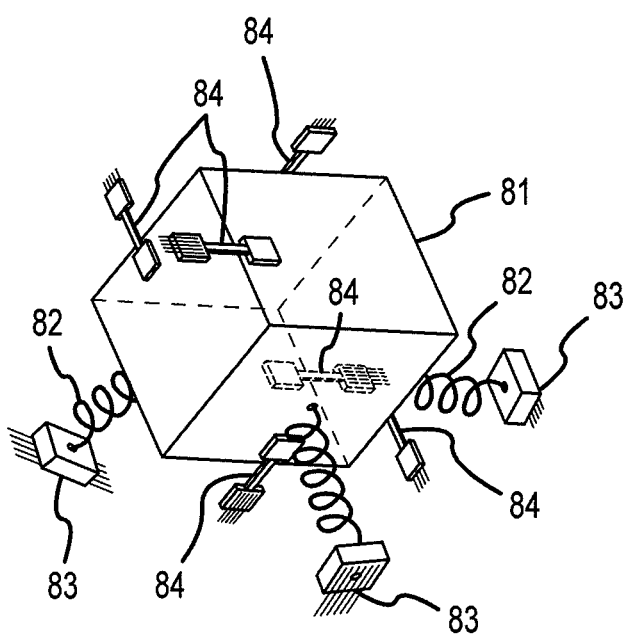
FIG. 8 is an isometric view of a triaxial digital high-resolution seismic and gravity sensor with an inertial mass held by six force-sensitive resonators and three gravity compensating helical springs.

FIG. 8 shows a triaxial digital high-resolution seismic and gravity sensor according to another embodiment of the invention. The sensor includes a mass 81 suspended along its body diagonal by springs 82 extending along three orthogonal directions. The advantage of such a spring arrangement is to make the outputs of all resonators 84 symmetrical. Each spring is adjustable, for instance, by moving the frame attachments 83, to accommodate any gravitational field vector. Full scale range can be varied by using resonators 84 of different load capabilities. Again, the springs 82 may be used to substantially unload the resonators 84.

Figure 9:
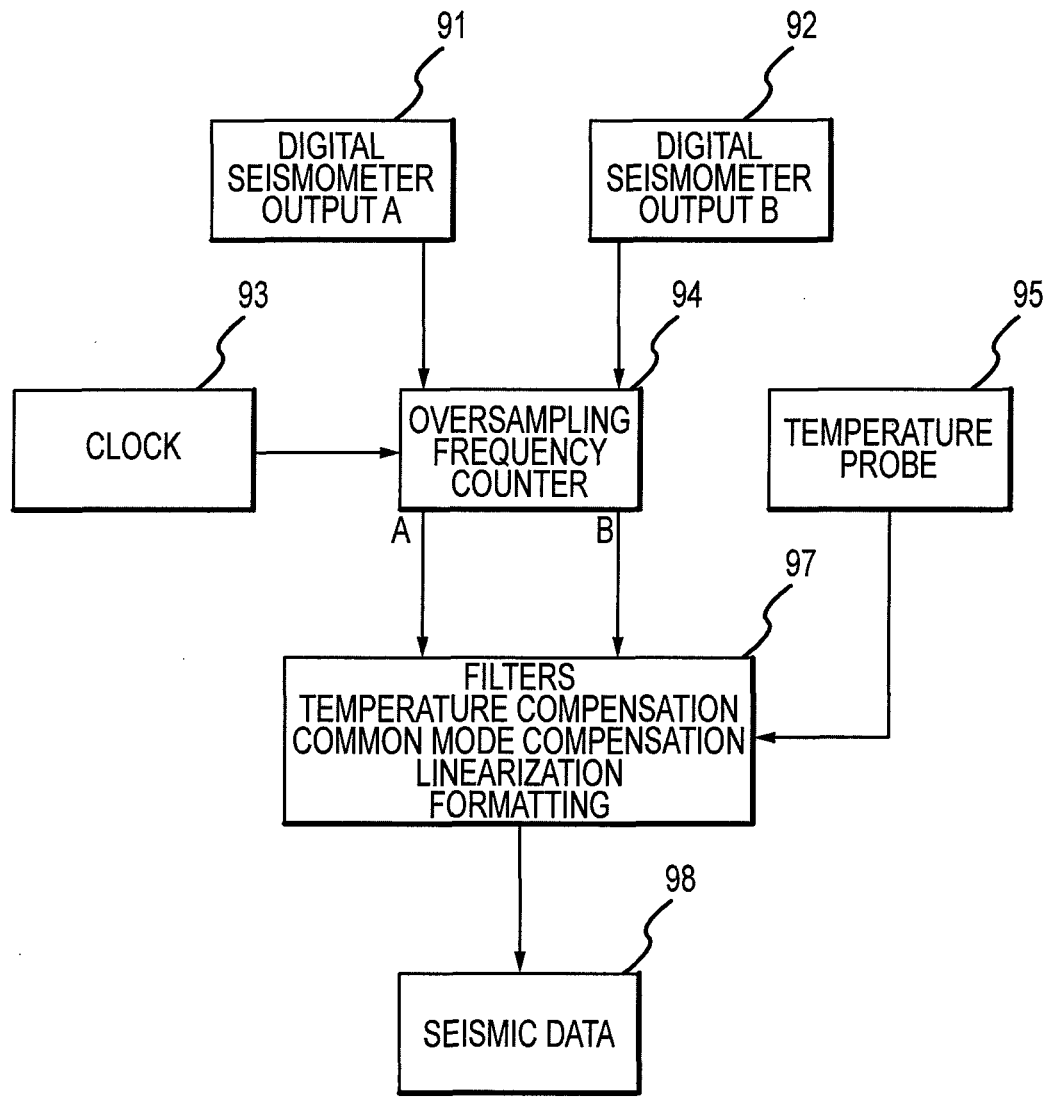
FIG. 9 is a block diagram of the major components of a seismic measurement system consisting of the dual mass, digital, high-resolution seismic and gravity sensor shown in FIG. 5 with outputs A and B being of opposite tension-compression polarity, a temperature probe, and a high-frequency clock standard. A high-resolution frequency counter measures the frequency outputs of the seismic and gravity sensors in comparison to the reference clock and passes the digital signals to a processing unit that includes anti-aliasing filters, digital signal processing, temperature compensation, common mode error compensation between outputs A and B, and linearization of the frequency signals into gravitational engineering units.

FIG. 9 is a block diagram showing the major components of a seismic and gravity measurement system according to an embodiment of the invention. The system includes a digital high-resolution seismic and gravity sensor 91 providing a signal Output A at a frequency indicative of acceleration with a compressive load-to-resonator sensitivity. A digital high-resolution seismic and gravity sensor 92 may provide a signal Output B at a frequency indicative of acceleration with a tensile load-to-resonator frequency sensitivity. Both signals Output A and Output B are applied to an oversampling frequency counter 94, which also receives inputs from a high-frequency clock standard 93. The counter 94 measures the frequency of the Outputs A and B of the seismic and gravity sensors 91, 92, respectively, in comparison to a time base provided by the reference clock 93. The counter 94 passes the digital signals to a processing unit 97 that includes digital signal processing with anti-aliasing FIR or IIR filters, temperature compensation using the output from a temperature probe 95, vibration rectification and common mode compensation between Outputs A and B, and linearization of the frequency signals into gravitational engineering units 98.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:
1. A seismic and gravity sensor, comprising:
a base frame;
an inertial mass;
at least one spring directly connecting the mass to the base frame, the at least one spring exerting a force on the mass substantially matched to the weight of the mass; and
at least one force-sensitive resonator having a first end portion connected to the base frame and a second end portion connected to the inertial mass to allow acceleration-induced forces applied to the mass to be applied to the force-sensitive resonator.

2. The sensor of claim 1 wherein the spring is substantially softer than the spring rate of the force-sensitive resonator along a sensitive axis of the force-sensitive resonator.

3. The sensor of claim 1 wherein the resonator comprises a single beam force-sensitive resonator.

4. The sensor of claim 1 wherein the resonator comprises a double-ended tuning fork resonator.

5. The sensor of claim 1 wherein the resonator is fabricated from crystalline quartz.

6. The sensor of claim 1 wherein the resonator is fabricated from silicon.

7. The sensor of claim 1 wherein the spring comprises a helical spring.

8. The sensor of claim 1 wherein the spring comprises a leaf-spring.

9. The sensor of claim 1 wherein the spring comprises a cantilevered beam.

10. The sensor of claim 1 wherein the spring comprises a spiral spring.

11. The sensor of claim 1, further comprising a plurality of springs supporting the mass from the base frame.

12. The sensor of claim 1, further comprising a plurality of force-sensitive resonators.

13. The sensor of claim 12 wherein the plurality of force-sensitive resonators are sensitive to forces exerted between the mass and the base frame extending in mutually orthogonal directions.

14. The sensor of claim 13 wherein one of the plurality of force-sensitive resonators is mounted so that it is tensioned by acceleration and/or gravity induced accelerations while another of the force-sensitive resonators is mounted so that it is compressed by acceleration and/or gravity induced accelerations.

15. The sensor of claim 1 wherein the spring comprises two spaced-apart cantilevered beams.

16. The sensor of claim 1 wherein the spring is made from crystalline quartz.

17. The sensor of claim 1 wherein the spring is fabricated from a material with a low thermoelastic coefficient.

18. The sensor of claim 1 wherein a compliant support member is added in series with the force-sensitive resonator.

19. The sensor of claim 18 wherein the compliant support member is between the mass and the resonator.

20. The sensor of claim 18 wherein the compliant support member is between the resonator and the base frame.

21. The sensor of claim 1, further comprising a plurality of mechanical stops that limit the motion of the inertial mass.

22. The sensor of claim 1, further comprising a means of damping the motion of the inertial mass with inert gas between closely spaced surfaces, one connected to the inertial mass and the other to the base frame.

23. The sensor of claim 1, further comprising a means of damping the motion of the inertial mass with induced electromagnetic fields.

24. The sensor of claim 1, further comprising a hermetic enclosure that is evacuated.

25. The sensor of claim 1, further comprising an enclosure that is back-filled with inert gas.

26. The sensor of claim 1, wherein the base frame is mounted on a mechanical isolation filter that includes a dampened external spring arrangement.

27. The sensor of claim 1, wherein at least one force-sensitive resonator having a first end portion connected to the base frame and a second end portion connected to a force-transmitting structure operable to transmit acceleration-induced loads of the mass to the force-sensitive resonator.

28. The sensor of claim 27, wherein the force-transmitting structure is a transmitting beam on a flexure pivot.

29. The sensor of claim 28 wherein the flexure pivot is a crossed hinge.

30. The sensor of claim 29 wherein the crossed hinge is made of crystalline quartz.

31. The sensor of claim 30 wherein the gap spanned by the crossed hinge is substantially the same as the length of the force-sensitive resonator that is also fabricated from crystalline quartz.

32. The sensor of claim 28 wherein the inertial mass and the end portion of the resonator are connected to the transmitting beam at opposite sides of the flexure.

33. The sensor of claim 28 wherein the inertial mass and the end portion of the resonator are connected to the transmitting beam at the same side of the flexure.

34. The sensor of claim 28 wherein the inertial mass and the end portion of the resonator are connected at different lever-arm ratios from the flexure.

35. The sensor of claim 1 wherein the at least one force-sensitive resonator comprises:
   a first force-sensitive resonator connected to one of masses such that acceleration-induced loads impart tensile stresses; and
   a second force-sensitive resonator connected to the other mass such that acceleration-induced loads impart compressive stresses.

36. A measurement system, comprising the sensor of claim 35 and electronic means to excite the natural resonant frequencies of the resonators, and further comprising frequency counters that measure the outputs of the two resonators and a processing unit that compares the two outputs and discriminates against common-mode errors.

37. A measurement system comprising two seismic and gravity sensors of claim 1 with said axes in substantially orthogonal directions.

38. A measurement system comprising three seismic and gravity sensors of claim 1 with said axes in substantially orthogonal directions.

39. A method of measuring seismic acceleration and variations of gravity with the apparatus of claim 1, wherein the method comprises:
   transmitting gravity variations and acceleration-induced loads to a force-sensitive resonator connected between an inertial mass and a base;
   substantially supporting the weight of the inertial mass along an axis;
   exciting a natural resonant frequency of the resonator; and
   measuring the excited natural resonant frequency of the resonator.

40. The method of claim 39, further comprising correcting the loads transmitted to the force-sensitive resonator for temperature-induced errors.

41. The method of claim 40 wherein the act of correcting the loads transmitted to the force-sensitive resonator for temperature-induced errors comprises:
   measuring a temperature associated with the force-sensitive resonator; and using the measured temperature to compensate for temperature-induced errors.

42. The method of claim 39, further comprising linearizing the measurement of the excited natural resonant frequency of the force-sensitive resonator into gravitational engineering units.

43. The method of claim 39, further comprising filtering the measurement of the excited natural resonant frequency of the force-sensitive resonator for digital aliasing errors.

44. The method of claim 43 wherein the act of filtering the measurement of the excited natural resonant frequency of the force-sensitive resonator for digital aliasing errors comprises filtering the measurement of the excited natural resonant frequency of the force-sensitive resonator with an infinite impulse response (IIR) algorithm.

45. The method of claim 43 wherein the act of filtering the measurement of the excited natural resonant frequency of the force-sensitive resonator for digital aliasing errors comprises filtering the measurement of the excited natural resonant frequency of the force-sensitive resonator with a finite impulse response (FIR) algorithm.

46. The sensor of claim 1 wherein the at least one force-sensitive resonator comprises three pairs of force sensitive resonators attached to the inertial mass, with each pair extending from the inertial mass in substantially parallel directions along respective axes that are substantially orthogonal to each other, the force-sensitive resonators in each pair being spaced apart from each other to suspend the inertial mass along said respective axes, and connecting means wherein acceleration-induced loads of the inertial mass are transmitted to the force-sensitive resonators.

47. The sensor of claim 46 wherein one member of each pair of support members senses a compressive load of the acceleration-induced load and the other senses a tensile load.

48. The sensor of claim 46 wherein at least one of the stress sensors is a force-sensitive resonator.

49. The sensor of claim 46 wherein the spring arrangement consists of a plurality of springs extending in substantially orthogonal directions, the plurality of springs substantially supporting the inertial mass in the static gravitational field.

50. A method of measuring seismic acceleration and gravity variations, the method comprising:
   the sensor of claim 46;
   exciting a natural resonant frequency of each resonator; and
   measuring the excited natural resonant frequency of each resonator.

* * * * *